Feb. 26, 1963 R. I. HAYWOOD ETAL 3,078,750
CUTTING MACHINE
Filed July 6, 1959

INVENTORS
RUSSELL I. HAYWOOD &
BY JAMES J. COCHRAN
ATTORNEYS

United States Patent Office 3,078,750
Patented Feb. 26, 1963

3,078,750
CUTTING MACHINE
Russell I. Haywood and James J. Cochran, Kettering, Ohio, assignors to Harris-Intertype Corporation, Cleveland, Ohio, a corporation of Delaware
Filed July 6, 1959, Ser. No. 825,100
3 Claims. (Cl. 83—58)

This application relates to a control for preventing damage to heavy machinery as a result of failure of a shear pin or other force overload responsive device, and particularly to a control for disabling the drive to a reciprocating cutter knife in response to failure of a shear pin in the knife drive linkage resulting from excessive resistance to driven movement of the knife.

In many types of heavy machinery it is customary to include shear pins or similar failure-on-overload devices to prevent damage to expensive driven parts which may on occasion by subject to severe overload or resistance to movement. In the case of shear pins, connecting driving and driven members, the pin breaks and eliminates the drive connection, but the driving member may continue to move. This may result in the driving member losing its guidance in the machinery and flailing about, causing damage to parts which are otherwise not affected. The present invention provides a fail-safe arrangement which acts in response to shear pin failure to stop such a driving member by stopping the drive force thereto.

A preferred embodiment of the invention includes a fused or breaker controlled electrical circuit and responds to mechanical overload failure to open the circuit and thus to cut off the electrical power supply until such time as the cause of the overload is eliminated, the shear pin replaced, and the fuse or breaker restored to renew power supply to the machine, or at least to the parts affected by the overload.

Therefore, the primary object of this invention is to provide an improved fail-safe overload responsive control for machinery having parts driven with substantial force, particularly where the parts operate normally through a predetermined motion, such as the cutting knife of a power operated cutter.

Another object of the invention is to provide a mechanical overload responsive control in which an electrical probe is supported in insulated relation within a hollow shear pin, and is adapted to complete a shunt circuit through a control fuse upon contact between the probe and a portion of the pin as it breaks, and thus to open a power supply circuit for a machine drive.

An additional object of this invention is to provide a force overload control for the drive linkage of a power operated cutting machine, wherein the drive to the cutting machine is interrupted by breakage of a shear pin, and wherein such breakage also causes a control circuit to open an electrical power supply for preventing further substantial movement of the driving part of the linkage.

Other objects and advantages of the invention will be apparent from the following description, the accompanying drawings and the appended claims.

Figure 1:
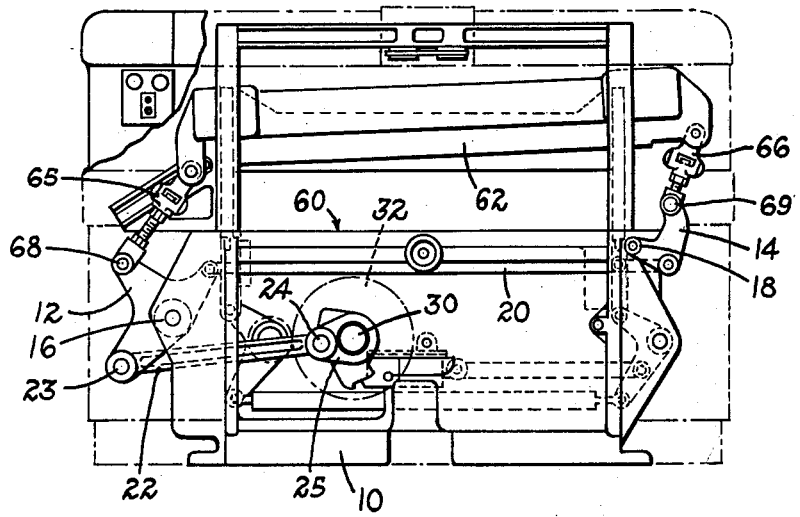
FIG. 1 is a somewhat schematic front view of a paper cutter to which the present invention may be applied, with the operating parts of the cutting knife shown in elevation, and with the major part of the machine housing shown in phantom lines.

Referring to the drawing which illustrates a preferred embodiment of the present invention, the control is shown as applied to a large cutting machine particularly adapted for cutting stacks of sheet material such as paper, paperboard, cardboard or the like. Details of such a machine are shown in U.S. Patent No. 2,599,591 to Spiller et al., issued June 10, 1952, and therefore only those parts of the machine necessary for a complete understanding of this invention are described here in detail. The machine includes a base 10 on which a pair of bell cranks 12 and 14 are pivotally mounted, in bearings 16 and 18, respectively, and which are joined by a tie rod 20 for concurrent pivotal movement thereof.

Figure 2:
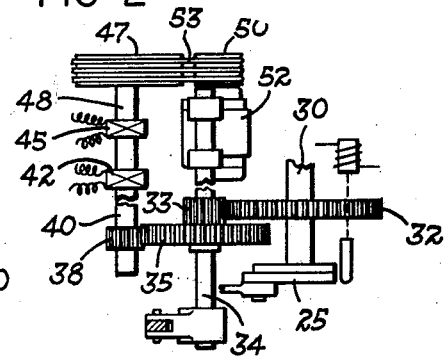
FIG. 2 is a diagrammatic illustration of the drive connection for rotating the drive crank shown in FIG. 1.

This movement is provided by a connecting rod 22 which is pivotally connected to bell crank 16 at the bearing 23, and is likewise connected through a bearing 24 to a rotatable crank 25. This crank is secured to a drive shaft 30 (FIG. 2) which is in turn driven by a gear 32 mounted thereon and in mesh with a pinion 33 carried on a countershaft 34. The countershaft also carries a drive gear 35 meshing with a drive pinion 38 fixed to the power input shaft 40. This shaft is connected to a brake 42, preferably of the electromagnetic type which is engaged when deenergized, and an electrically controlled clutch 45 controls the transmission of power to shaft 40 from an input source including the driven pulley 47, its stub shaft 48, and the drive pulley 50 which is rotated by motor 52 and drives the pulley 47 through belts 53.

The cutting machine also includes a work supporting table 60 and a knife 62 extending transversely normally in spaced relation above the table, and provided with suitable side guides (not shown) which limit a movement of the knife to reciprocating motion in a generally vertical plane toward and away from the table surface for cutting work supported thereon. The knife is drive from the bell cranks 12 and 14 through adjustable drive links 65 and 66, these links being pivotally connected to bell cranks 12 and 14 respectively through bearings 68 and 69. The various radius arms of the bell cranks and the lengths of the links 65 and 66 are so related that the knife in its raised position, as shown, extends in a generally horizontal plane somewhat at an angle to the table surface, and during the cutting stroke the knife is drawn downwardly and to the left, as shown in FIG. 1, to produce a shearing action upon material supported on table 60, with the knife edge terminating at the end of the cutting stroke in slight contact with a cutting stick or the like (not shown) supported in the table surface in the usual manner.

As can readily be understood from the above description, if for some reason the knife 62 becomes jammed either in its guideways or against an obstruction on the table, severe strain is placed upon all of the above described drive mechanisms, and therefore it is desirable to provide shear pins in certain of the bearings, connections, or the like which are designed to fail upon exertion of a predetermined mechanical overload thereon. For example, such a shear pin might be used in the bearing 23, and upon failure thereof the drive between connecting rod 22 and bell crank 12 would be broken.

Figure 3:
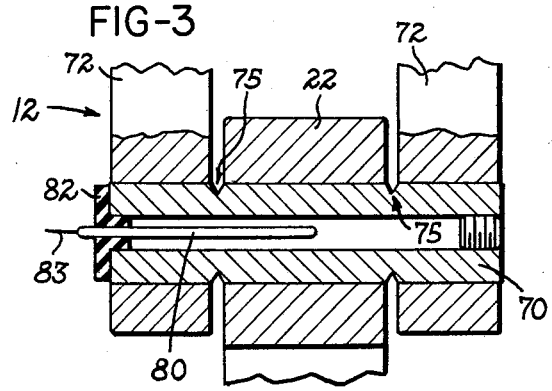
FIG. 3 is an enlarged detail sectional view of the shear pin incorporated in the drive linkage shown in FIG. 1.

Referring to FIG. 3, such a connection is shown, and for purposes of explanation it will be assumed to exist in the bearing 23. Therefore, the end of connecting rod 22 is shown in section surrounding a hollow or generally tubular shear pin 70 which is supported at its opposite ends in the bifurcated end 72 of the bell crank 12. This shear pin is notched or otherwise relieved in the areas indicated generally at 75 to predetermine the thickness of the pin at these points, and therefore the pin will shear or break at these points when an overload resistance to knife movement causes a predetermined resistance to movement of the bell crank 12.

Figure 4:
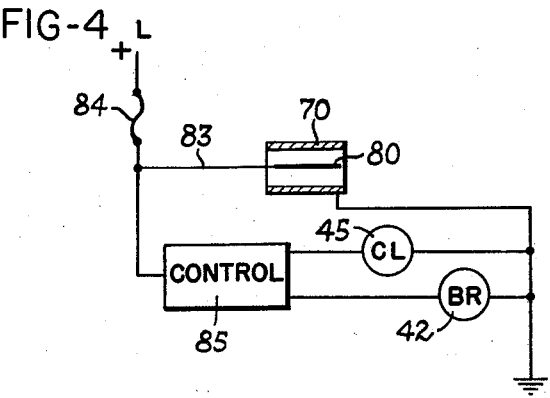
FIG. 4 is a wiring diagram showing a typical application of the probe and hollow shear pin construction illustrated in FIG. 3.

An electrical probe 80 is supported in spaced insulated relation within shear pin 70, extending through a fiber or other type of insulating mounting washer 82 and across at least one of the shear points 75, and having an output electrical lead or wire 83. Referring to FIG. 4, the general arrangement of a control circuit for the drive to the knife is shown as including a source of electrical power designated upon, and being equivalent, for example, to the hot line in a D.C. circuit, with the parts operating between the potential of this line and ground as indicated. Also, the frame of the cutting machine and its working parts are connected to ground potential. The line includes suitable electrical overload responsive circuit breaking means, such as the fuse 84, and controls the supply of power to a control circuit indicated generally at 85 which is adapted to control the power applied through parallel lines energizing the brake 42 and clutch 45, as shown. In shunt with this control and the brake and clutch is the lead 83 and probe 80, such that if the shear pin 70 fails due to mechanical overload, the probe is grounded against the breaking pin and connects the line L directly to ground, causing the power supply to fail or open (as by blowing fuse 84) due to the substantial electrical overload, there being in effect substantially a direct short in the circuit. This results in a cutting off of electrical power to control 85, and the clutch 45 is deenergized to open, while brake 42 is deenergized and thus moves to its normally closed or applied position, stopping the drive output.

Accordingly, the present invention provides a mechanical overload responsive control which operates upon breaking of a shear pin, or other mechanical member of predetermined force transmission ability, to terminate the power supply to all parts of the moving drive with which the shear pin is associated, and thus to prevent damage wihch might result from movement of the parts relative to each other in a non-driving relation. The control includes an electrical probe element which may conveniently be mounted within a hollow shear pin of conventional type, in electrically insulated relation thereto, and so connected that when the pin breaks portions thereof will strike the probe to complete a shorting or ground circuit causing a main power supply fuse to blow or a circuit breaker to open. Thus, power input is cut off and must be reset, as well as the shear pin replaced, before the machine is again operative.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. An overload sensing device for controlling application of power through drive means including a power driven member and a load connecting driving member, a hollow shear member providing the sole force transmissive connection between said driving and driven members and being constructed and arranged to break upon application thereto of force in excess of a predetermined force, an electrical probe member extending interiorly of said shear member in completely spaced relation thereto providing a normally open circuit connection, an electrically insulating mounting member supporting said probe within said shear member extending across a portion of said shear member designed to separate under mechanical overload to assure at least momentary contact between a portion of said shear member and said probe upon breakage of said member, and circuit means including said shear member and said probe member arranged to stop the application of power by the drive means in response to contact between said shear member and said probe member.

2. An overload sensing device for controlling application of power through drive means including a power driven reciprocating link and a load connected driving link, comprising an electrical control governing operation of said drive means, a hollow shear pin providing the sole force transmissive connection between said driving and driven links and being constructed and arranged to break upon application thereto of force in excess of a predetermined force, an electrical probe member extending interiorly of said shear pin in completely spaced relation thereto providing a normally open circuit connection, an electrically insulating mounting member supporting said probe within said shear pin extending across a portion of said shear pin designed to separate under mechanical overload to assure at least momentary contact between a portion of said shear pin and said probe upon breakage of said shear pin, an electric circuit including said control and the normally open connection formed by said probe member and said shear pin, and circuit breaking means in said circuit operable to open the electrical supply to said control in response to an overload on said circuit breaking means caused by at least temporary closing of said normally open connection upon shear pin breakage.

3. A mechanical overload sensing control for machines having a power drive with an electrical controller and a power driven member transmitting power from said drive, comprising a load connected driving member, a shear member providing the sole force transmissive connection between said driving and driven members and being constructed and arranged to break upon application thereto of force in excess of a predetermined force, an electrical probe member, electrically insulating mounting means supporting said probe member in predetermined spaced relation to that portion of said shear member designed to separate under mechanical overload to define therewith a normally open circuit connection and to assure at least momentary contact between such portion of said shear member and said probe member upon breakage of said shear member and movement of such portion thereof toward said mounting means, a circuit breaking device, and circuit means including said probe member, said shear member, said circuit breaking device, and said electrical controller and arranged to disable said power drive by disabling said electric controller in response to breakage of said shear member.

References Cited in the file of this patent
UNITED STATES PATENTS

| | | |
|---|---|---|
| 1,183,620 | Biggert | May 16, 1916 |
| 2,022,007 | Moore | Nov. 26, 1935 |
| 2,205,370 | Brice | June 18, 1940 |
| 2,770,342 | Johansen | Nov. 13, 1956 |
| 2,812,843 | Hummel | Nov. 12, 1957 |
| 2,820,518 | Shumaker | Jan. 21, 1958 |